2,977,392
PREPARATION OF LIQUID ALKYLATED PENTABORANE

Herbert Landesman, Covina, Calif., assignor to Olin Mathieson Chemical Corporation, a corporation of Virginia No Drawing. Filed July 29, 1957, Ser. No. 674,978

8 Claims. (Cl. 260—606.5)

This invention relates to a method for the manufacture of liquid alkylated pentaboranes. Such materials are useful as fuels, particularly fuels for gas turbines, when burned with air, as described in Altwicker, Garrett, Weilmunster and Harris application Serial No. 497,408, filed March 28, 1955.

In accordance with the present invention, it has been discovered that pentaborane-9 and the lower alkyletherates of boron trifluoride can be reacted in admixture with an alkylation catalyst to form liquid alkylated pentaboranes. The lower alkyl etherates of boron trifluoride that can be used are those which contain from 1 to 4 carbon atoms in each alkyl radical, among them being boron trifluoride methyletherate, boron trifluoride methylethyletherate, boron trifluoride n-propyletherate, boron trifluoride methylpropyletherate, boron trifluoride n-butyletherate and the like. A wide variety of alkylation catalysts can be employed for the purpose of promoting the reaction between the pentaborane-9 and the lower alkyl etherate of boron trifluoride, for example aluminum chloride, aluminum bromide, ferric chloride, ferric bromide and the like. Preferably, the quantity of lower alkyl etherate of boron trifluoride used will be within the range from about 0.5 to about 4.0 moles of lower alkyl etherate of boron trifluoride per mole of pentaborane-9, and the quantity of catalyst used will be within the range from about 0.6 to 10 moles of catalyst per mole of pentaborane-9. The temperature employed in carrying out the reaction can be varied widely from about 0° C. to about 125° C., preferably from 0° C. to about 100° C. The alkyl pentaboranes produced by carrying out the reaction can be separated from the reaction mixture by using conventional fractionation, preferably vacuum fractionation.

The following example illustrates an embodiment falling within the scope of this invention.

Example

In the first step of this experiment there was introduced into a 50 cc. glass tube, equipped with a break-off, 4 grams of aluminum chloride and 0.5 cc. of boron trifluoride ethyletherate. The tube was cooled to Dry Ice temperature, attached to a vacuum line and evacuated. After the tube had been cooled to —78° C. by means of immersion in a cold bath containing a mixture of Dry Ice and acetone, 0.5 cc. of pentaborane-9 was condensed into it and the tube was sealed off. The tube was allowed to warm to room temperature and then heated at 60° C. for 3 hours on a water bath. In the next step, the tube was cooled to —196° C. by immersion in a bath containing liquid nitrogen, attached to a vacuum system and then opened under vacuum. The non-condensable gas which consisted of hydrogen in the amount of 50 ml. was pumped out of reaction tube and measured in a calibrated system. After the reactor tube had been allowed to warm up to room temperature, the volatile materials were pumped off and fractionated through a series of traps cooled to —10° C., —45° C., and —80° C., respectively. The material retained in each trap was transferred to a graduated tube, the volume measured, and a sample taken for analysis. A total of 0.23 cc. of liquid material was taken from the trap maintained at —10° C. and this material was shown by mass spectral analysis to be monoethylpentaborane-9. From the trap held at —45° C., there was obtained 0.32 cc. of liquid which was essentially ether and hydrogen chloride as shown by mass spectral analysis. From the trap maintained at —80° C. there was obtained 0.17 cc. of liquid which was shown by mass spectral analysis to be 10 percent monoethylpentaborane-9 and the remainder ethyl chloride, ether and hydrogen chloride. Based on the quantity of pentaborane-9 used in the reaction, the yield of monoethylpentaborane-9 was 58 percent.

What is claimed is:

1. A method for the production of liquid alkylated pentaborane which comprises reacting pentaborane-9 and from about 0.5 to about 4.0 moles per mole of pentaborane-9 of a lower alkyletherate of boron trifluoride containing from 1 to 4 carbon atoms in each alkyl radical at a temperature within the range from about 0° C. to about 125° C. while the reaction mixture contains from about 0.6 to about 10 moles per mole of pentaborane-9 of an alkylation catalyst selected from the group consisting of aluminum chloride, aluminum bromide, ferric chloride, and ferric bromide, and recovering a liquid alkylated pentaborane from the reaction mixture.

2. The method of claim 1 wherein said etherate is boron trifluoride ethyletherate.

3. The method of claim 1 wherein said alkylation catalyst is aluminum chloride.

4. The method of claim 1 wherein said alkylation catalyst is aluminum bromide.

5. The method of claim 1 wherein said alkylation catalyst is ferric chloride.

6. The method of claim 1 wherein said etherate is boron trifluoride ethyletherate and wherein said alkylation catalyst is aluminum chloride.

7. The method of claim 1 wherein said etherate is boron trifluoride ethyletherate and wherein said alkylation catalyst is aluminum bromide.

8. The method of claim 1 wherein said etherate is boron trifluoride ethyletherate and wherein said alkylation catalyst is ferric chloride.

No references cited.